United States Patent
Yang et al.

(10) Patent No.: US 11,979,217 B2
(45) Date of Patent: May 7, 2024

(54) METHOD FOR CONFIGURING APERIODIC CHANNEL STATE INFORMATION-REFERENCE SIGNAL, NETWORK DEVICE, AND TERMINAL

(71) Applicant: VIVO MOBILE COMMUNICATION CO., LTD., Dongguan (CN)

(72) Inventors: Yu Yang, Dongguan (CN); Peng Sun, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 275 days.

(21) Appl. No.: 17/234,839

(22) Filed: Apr. 20, 2021

(65) Prior Publication Data
US 2021/0242926 A1 Aug. 5, 2021

Related U.S. Application Data

(63) Continuation of application No. PCT/CN2019/104903, filed on Sep. 9, 2019.

(30) Foreign Application Priority Data

Oct. 30, 2018 (CN) .......... 201811280946.2

(51) Int. Cl.
*H04B 7/08* (2006.01)
*H04B 7/06* (2006.01)
(Continued)

(52) U.S. Cl.
CPC .......... *H04B 7/088* (2013.01); *H04B 7/0626* (2013.01); *H04L 5/0051* (2013.01); *H04W 8/24* (2013.01); *H04W 24/10* (2013.01)

(58) Field of Classification Search
CPC ..... H04B 7/088; H04B 7/0626; H04L 5/0051; H04W 8/24; H04W 24/10
See application file for complete search history.

(56) References Cited

U.S. PATENT DOCUMENTS

| | | | |
|---|---|---|---|
| 11,303,490 B2* | 4/2022 | Shi | H04L 1/0026 |
| 2018/0115357 A1* | 4/2018 | Park | H04L 5/0051 |

(Continued)

FOREIGN PATENT DOCUMENTS

| | | |
|---|---|---|
| CN | 107466446 A | 12/2017 |
| CN | 108696346 A | 10/2018 |

(Continued)

OTHER PUBLICATIONS

International Search Report issued in corresponding International Application No. PCT/CN2019/104903, dated Dec. 9, 2019, 4 pages.
(Continued)

*Primary Examiner* — Deepa Belur
(74) *Attorney, Agent, or Firm* — IPX PLLC (57) ABSTRACT

The present disclosure discloses a method for configuring an aperiodic channel state information-reference signal, a network device, and a terminal. The method includes: obtaining terminal capability information; determining a threshold of an aperiodic channel state information-reference signal CSI-RS based on measurement behavior of the aperiodic CSI-RS and the terminal capability information; and sending the threshold to a terminal.

17 Claims, 4 Drawing Sheets

(51) Int. Cl.
H04L 5/00 (2006.01)
H04W 8/24 (2009.01)
H04W 24/10 (2009.01)

(56) References Cited

U.S. PATENT DOCUMENTS

| | | | |
|---|---|---|---|
| 2018/0227886 A1 | 8/2018 | Chou et al. | |
| 2019/0273637 A1* | 9/2019 | Zhang | H04W 80/02 |
| 2020/0288479 A1* | 9/2020 | Xi | H04W 24/08 |
| 2021/0337406 A1* | 10/2021 | Zhang | H04W 24/08 |
| 2023/0179354 A1* | 6/2023 | Muruganathan | H04L 5/0023 |
| | | | 370/329 |
| 2023/0276450 A1* | 8/2023 | Abdelghaffar | H04L 5/0044 |
| | | | 370/329 |

FOREIGN PATENT DOCUMENTS

| | | | | |
|---|---|---|---|---|
| EP | 3454477 A1 * | 3/2019 | | |
| WO | WO-2018030714 A1 * | 2/2018 | | H04L 1/00 |
| WO | WO-2020053977 A1 * | 3/2020 | | |

OTHER PUBLICATIONS

ZTE, "Maintenance for beam management", 3GPP TSG RAN WG1 Meeting #94bis, R1-1810214, Oct. 12, 2018, section 2.1.1, 2.1.2, 2.1.3 and 2.2.

* cited by examiner

METHOD FOR CONFIGURING APERIODIC CHANNEL STATE INFORMATION-REFERENCE SIGNAL, NETWORK DEVICE, AND TERMINAL

CROSS-REFERENCE TO RELATED APPLICATIONS

This application is a bypass continuation of PCT Application No. PCT/CN2019/104903 filed on Sep. 9, 2019, which claims priority to Chinese Patent Application No. 201811280946.2, filed on Oct. 30, 2018 in China, both of which are incorporated herein by reference in their entireties.

TECHNICAL FIELD

The present disclosure relates to the field of communications technologies, and in particular, to a method for configuring an aperiodic channel state information-reference signal, a network device, and a terminal.

BACKGROUND

In a mobile communications system, an operating frequency band supported by a system is increased to 6 GHz or more, and can be up to 100 GHz at maximum. A high frequency band has relatively rich idle frequency resources, and can provide a larger throughput for data transmission. In addition, a wavelength of a high frequency signal is short, and more antenna elements can be arranged on a panel of a same size. A beam with stronger directivity and a narrower lobe can be formed by using a beamforming technology. A network device configures a Transmission Configuration Indication (TCI) state (state) for a terminal by using Radio Resource Control (RRC) signaling, to indicate Quasi Co-Location (QCL) information.

For an aperiodic Channel State Information- Reference Signal (CSI-RS), the network device configures QCL information of an aperiodic CSI-RS resource by using RRC signaling. When the network device needs to transmit the aperiodic CSI-RS, Downlink Control Information(DCI) is used for triggering. The DCI carries a triggering state corresponding to the aperiodic CSI-RS resource, to trigger an aperiodic CSI-RS report and an aperiodic CSI-RS resource, including QCL information of the aperiodic CSI-RS resource. The terminal may determine, based on a space receiving parameter (QCL type D parameter) in the QCL information, a receive beam required for receiving the aperiodic CSI-RS, to implement beam indication for the aperiodic CSI-RS.

When the aperiodic CSI-RS is scheduled, the DCI indicates a triggering offset. When the terminal reports a capability parameter to the network device, that is, reports terminal performance (capability), the DCI includes a beam switching timing of the aperiodic CSI-RS. When the beam switching timing of the aperiodic CSI-RS reported by the terminal exceeds a maximum value of the triggering offset, the terminal cannot measure a specified beam indicated by the DCI.

SUMMARY

Some embodiments of the present disclosure provide a method for configuring an aperiodic channel state information-reference signal, a network device, and a terminal, to resolve a problem that a terminal cannot measure, based on an aperiodic CSI-RS in some scenarios, a specified beam indicated by DCI.

According to a first aspect, some embodiments of the present disclosure provide a method for configuring an aperiodic channel state information-reference signal, applied to a network device side and including:
   obtaining terminal capability information;
   determining a threshold of an aperiodic channel state information-reference signal CSI-RS based on measurement behavior of the aperiodic CSI-RS and the terminal capability information; and
   sending the threshold to a terminal.

According to a second aspect, some embodiments of the present disclosure further provide a network side device, including:
   a first obtaining module, configured to obtain terminal capability information;
   a first processing module, configured to determine a threshold of an aperiodic channel state information-reference signal CSI-RS based on measurement behavior of the aperiodic CSI-RS and the terminal capability information; and
   a first sending module, configured to send the threshold to a terminal.

According to a third aspect, some embodiments of the present disclosure further provide a network device. The network device includes a processor, a memory, and a computer program that is stored in the memory and that can run on the processor, where when the processor executes the computer program, steps of the method for configuring an aperiodic channel state information-reference signal described above are implemented.

According to a fourth aspect, some embodiments of the present disclosure provide a method for configuring an aperiodic channel state information-reference signal, applied to a terminal side and including:
   sending terminal capability information to a network device;
   receiving a threshold of an aperiodic channel state information-reference signal CSI-RS, where the threshold is determined based on measurement behavior of the aperiodic CSI-RS and the terminal capability information.
   determining a receive beam of the aperiodic CSI-RS based on the threshold.

According to a fifth aspect, some embodiments of the present disclosure further provide a terminal, including:
   a fourth sending module, configured to send terminal capability information to a network device;
   a first receiving module, configured to receive a threshold of an aperiodic channel state information-reference signal CSI-RS, where the threshold is determined based on measurement behavior of the aperiodic CSI-RS and the terminal capability information; and
   a third processing module, configured to determine a receive beam of the aperiodic CSI-RS based on the threshold.

According to a sixth aspect, some embodiments of the present disclosure further provide a terminal. The terminal includes a processor, a memory, and a computer program that is stored in the memory and that can run on the processor, where when the processor executes the computer program, steps of the method for configuring an aperiodic channel state information-reference signal described above are implemented.

According to a seventh aspect, some embodiments of the present disclosure further provide a computer readable storage medium. The computer readable storage medium stores a computer program, and when a processor executes the computer program, steps of the method for configuring an aperiodic channel state information-reference signal described above are implemented.

In this way, in some embodiments of the present disclosure, when the aperiodic CSI-RS is triggered, a scheduling offset threshold of the aperiodic CSI-RS may be determined based on the terminal capability information and the measurement behavior of the aperiodic CSI-RS, so as to determine beam information of the aperiodic CSI-RS, to ensure normal signal transmission and measurement, thereby improving communication reliability and validity.

BRIEF DESCRIPTION OF DRAWINGS

To describe the technical solutions in some embodiments of the present disclosure more clearly, the following briefly describes the accompanying drawings required for describing some embodiments of the present disclosures. Apparently, the accompanying drawings in the following description show merely some embodiments of the present disclosure, and a person of ordinary skill in the art may still derive other drawings from these accompanying drawings without creative efforts.

DETAILED DESCRIPTION

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. Instead, these embodiments are provided in order to provide a more thorough understanding of the present disclosure and to be able to convey the scope of the present disclosure to a person skilled in the art.

Terms "first,", "second", etc. in the Description and Claims of the present application are used to distinguish similar objects, instead of describing a specific sequence or order. It should be understood that the number termed in such a way is interchangeable in proper circumstances so that the embodiments of this application described herein can be implemented in an order other than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. "And/or" used in this specification and claims means at least one of the associated objects.

The technology described in this specification is not limited to a Long Term Evolution (LTE)/LTE-Advanced (LTE-A) system, and may also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (—FDMA), and another system. The terms "system" and "network" are often used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. The functions and arrangements of the elements under discussion may be changed without departing from the spirit and scope of the present disclosure. In various examples, various procedures or components may be omitted, replaced, or added appropriately. For example, the described method may be performed in an order different from that described, and steps may be added, omitted, or combined. In addition, features described with reference to some examples may be combined in other examples.

Figure 1:
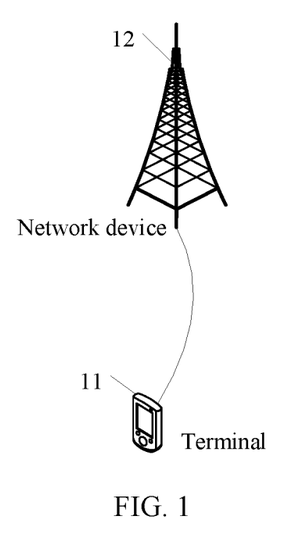
FIG. 1 is a block diagram of a mobile communications system to which some embodiments of the present disclosure can be applied.

Referring to FIG. 1, FIG. 1 is a block diagram of a wireless communications system applicable to some embodiments of the present disclosure. The wireless communications system includes a terminal 11 and a network device 12. The terminal 11 may also be referred to as a terminal device to User Equipment (UE). The terminal 11 may be a terminal side device such as a mobile phone, a Tablet Personal Computer, a Laptop Computer, a Personal Digital Assistant (PDA), a Mobile Internet Device (MID), a Wearable Device, or an in-vehicle device. It should be noted that a specific type of the terminal 11 is not limited in some embodiments of the present disclosure. The network device 12 may be a base station or a core network. The base station may be a base station of 5G or a later version (for example, gNB or 5G NR NB), or a base station in another communications system (for example, an eNB, a WLAN access point, or another access point). The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specified technical term. It should be noted that, in some embodiments of the present disclosure, only a base station in an NR system is used as an example, but a specific type of the base station is not limited.

The base station can communicate with the terminal 11 under the control of a base station controller. In various examples, the base station controller may be a part of the core network or some base stations. Some base stations can exchange control information or user data with the core network through backhaul. In some examples, some of these base stations may communicate directly or indirectly with each other through a backhaul link, and the backhaul link may be a wired or wireless communication link. The wireless communications system can support operations on a plurality of carriers (waveform signals of different frequencies). A multi-carrier transmitter can simultaneously transmit a modulated signal on the plurality of carriers. For example, each communication link may be a multi-carrier signal modulated based on various radio technologies. Each modulated signal may be sent on a different carrier and may carry control information (for example, a reference signal or a control channel), overhead information, data, and the like.

The base station can wirelessly communicate with the terminal 11 via one or more access point antennas. Each base station may provide communication coverage for a corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

Figure 2:
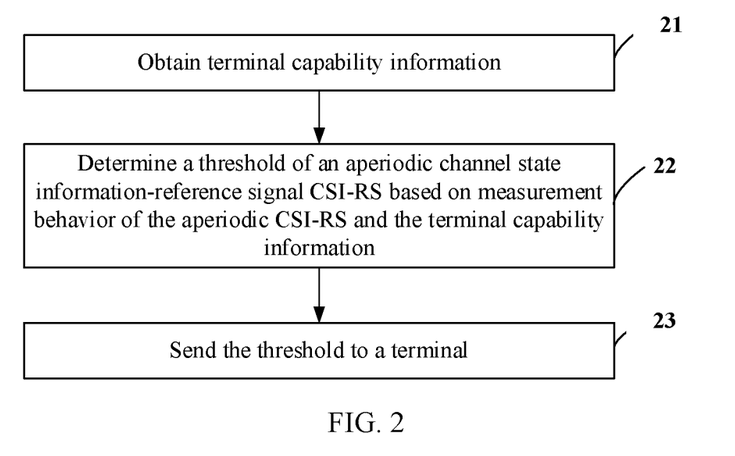
FIG. 2 is a schematic flowchart of a method for configuring an aperiodic channel state information-reference signal on a network device side according to some embodiments of the present disclosure.

Some embodiments of the present disclosure provide a method for configuring an aperiodic channel state information-reference signal, applied to a network device side. As shown in FIG. 2, the method may include the following steps.

Step 21: Obtain terminal capability information.

The terminal capability information, or referred to as terminal performance (UE capability) information, is used to indicate a data processing capability (such as an upload rate or a download rate), a maximum spatial multiplexing (such as a quantity of supported antenna ports) capability, a modulation and coding capability, and the like supported by the terminal. The terminal capability information may be sent by a terminal to a network device. The terminal capability information includes a plurality of parameters that are used to represent different performance types, and a value of a parameter indicates a support capability of the terminal in a corresponding performance type. The terminal capability information includes parameters such as an aperiodic channel state information-reference signal CSI-RS beam switching timing (aperiodic CSI-RS beam switching timing, AP-CSI-RS beam switching timing, or A-CSI-RS beam switching timing). The parameter is a minimum time length between triggering DCI of an aperiodic CSI-RS and sending of the aperiodic CSI-RS, for example, a time length or a quantity of symbols between the last symbol of the DCI and the first symbol of the aperiodic CSI-RS. A value (capability parameter) of the parameter is related to a subcarrier spacing, and the value of the parameter includes {114, 28, 48, 224, 336}.

Step 22: Determine a threshold of an aperiodic channel state information-reference signal CSI-RS based on measurement behavior of the aperiodic CSI-RS and the terminal capability information.

The measurement behavior of the aperiodic CSI-RS is a type of measurement in which the aperiodic CSI-RS is used, and the measurement behavior includes but is not limited to beam measurement and CSI measurement. In other words, the aperiodic CSI-RS may be used for beam measurement, or may be used for CSI measurement. The threshold of the aperiodic CSI-RS is jointly determined based on the measurement behavior of the aperiodic CSI-RS and the terminal capability information. The threshold is a scheduling offset threshold of the aperiodic CSI-RS. The scheduling offset is a time length between triggering DCI of an aperiodic CSI-RS and sending of the aperiodic CSI-RS.

Step 23: Send the threshold to a terminal.

After determining the scheduling offset threshold of the aperiodic CSI-RS, the network device indicates the threshold to the terminal, so that the terminal determines spatial information (such as a beam) of the aperiodic CSI-RS based on the threshold, to facilitate receiving and subsequent measurement of the aperiodic CSI-RS.

The following further describes implementation of step 22 with reference to different scenarios in this embodiment.

Scenario 1: A case that the measurement behavior of the aperiodic CSI-RS is beam measurement, that is, a case that the aperiodic CSI-RS is used for beam measurement.

Step 22: Determine a value indicated by a specific parameter in the terminal capability information as the threshold. That is, in the scenario in which the aperiodic CSI-RS is used for beam measurement, the network device may determine the value of the specific parameter reported by the terminal as the scheduling offset threshold of the aperiodic CSI-RS.

The specific parameter is a beam switching timing of the aperiodic CSI-RS. Assuming that the beam switching timing of the aperiodic CSI-RS reported by the terminal is one of {14, 28, 48, 224, 336}, a specific value of the beam switching timing reported by the terminal is determined as the scheduling offset threshold of the aperiodic CSI-RS. For example, if the beam switching timing reported by the terminal is 14, 14 is determined as the threshold; if the reported beam switching timing is 224, 224 is determined as the threshold.

Scenario 2: A case that the measurement behavior of the aperiodic CSI-RS is CSI measurement, that is, a case that the aperiodic CSI-RS is used for CSI measurement.

When a value of the beam switching timing of the aperiodic CSI-RS reported by the terminal is relatively large, if the relatively large value is used as the scheduling offset threshold, for the aperiodic CSI-RS for CSI measurement, the terminal does not require an excessively long time to implement beam switching for receiving the aperiodic CSI-RS. Consequently, a delay of measuring, by the terminal, CSI on a specified beam indicated by DCI is too large, or even the CSI on the specified beam indicated by the DCI cannot be measured. Therefore, step 22 includes: If a value indicated by a specific parameter in the capability information of the terminal is greater than a preset value, determine one of the following values as the threshold. The value is:

a maximum value that is in optional values of the specific parameter and that is less than the preset value;

a minimum value that is in optional values of the specific parameter and that is less than the preset value; or a specified value that is less than the preset value. The specified value may be indicated by the network device, or may be predefined (such as a protocol agreement or a vendor preconfiguration).

The preset value may be a maximum value available for a triggering offset of the aperiodic CSI-RS, or the preset value may be a value ranging from the $M^{th}$ optional value to the $N^{th}$ optional value of the specific parameter. The specific parameter may be the beam switching timing of the aperiodic CSI-RS, and the optional value of the specific parameter is {14, 28, 48, 224, 336}. In this case, the preset value may be a value ranging from the third optional value to the fourth optional value, that is, the preset value is a value greater than 48 and less than 224.

Further, when the preset value is a value greater than or equal to 48 and less than 224, if the value indicated by the beam switching timing of the non-periodic CSI-RS in the terminal capability information is greater than the preset value, one of the following values is determined as the threshold. The value is:

a maximum value in a set {14, 28, 48} that is in optional values {14, 28, 48, 224, 336} of the specific parameter and that is less than the preset value, namely, 48;

a minimum value in a set {114, 28, 48} that is in optional values {114, 28, 48, 224, 336} of the specific parameter and that is less than the preset value, namely, 14; or a specified value that is less than the preset value. It is assumed that the preset value is 180, and the specified value may be 80. The specified value may be indicated by the network device, or may be predefined (such as a protocol agreement or a vendor preconfiguration).

In addition, in the scenario 2, if the value indicated by the specific parameter in the capability information of the terminal is less than or equal to the preset value, the value of the specific parameter reported by the terminal is determined as the scheduling offset threshold of the aperiodic CSI-RS.

The specific parameter is a beam switching timing of the aperiodic CSI-RS. Assuming that the beam switching timing of the aperiodic CSI-RS reported by the terminal is one of {14, 28, 48}, a specific value of the beam switching timing reported by the terminal is determined as the scheduling offset threshold of the aperiodic CSI-RS. For example, if the beam switching timing reported by the terminal is 14, 14 is determined as the threshold; if the reported beam switching timing is 48, 48 is determined as the threshold.

After step 22, the method further includes: determining a transmit beam of the aperiodic CSI-RS based on the threshold, so that normal sending of the aperiodic CSI-RS can be ensured.

Further, the step of determining a transmit beam of the aperiodic CSI-RS based on the threshold includes:

when a triggering offset of the aperiodic CSI-RS is less than the threshold, determining the transmit beam based on default quasi-co-location QCL information, that is, when the triggering offset is less than the determined threshold, the network device determines the transmit beam of the aperiodic CSI-RS by using the default QCL information; or when a triggering offset of the aperiodic CSI-RS is greater than or equal to the threshold, determine the transmit beam based on QCL information corresponding to a Transmission Configuration Indication (TCI) state in downlink control information DCI, that is, when the triggering offset is greater than or equal to the determined threshold, the network device determines the transmit beam of the aperiodic CSI-RS based on the QCL information corresponding to the TCI state in the DCI.

Further, after the step of determining a transmit beam of the aperiodic CSI-RS based on the threshold, the method includes: sending the aperiodic CSI-RS on the transmit beam, so that the terminal completes corresponding measurement.

Further, after the network device determines the measurement behavior of the aperiodic CSI-RS, the method further includes: sending measurement behavior information to the terminal, where the measurement behavior information is used to indicate the measurement behavior of the aperiodic CSI-RS. In this way, after receiving the aperiodic CSI-RS, the terminal may perform beam measurement or CSI measurement based on the aperiodic CSI-RS according to an indication of the measurement behavior information. The measurement behavior information of the aperiodic CSI-RS may be explicitly or implicitly sent by the network device to the terminal. For example, when the network device configures a parameter of an aperiodic CSI-RS resource set, if the parameter includes a repetition (field), it indicates that the aperiodic CSI-RS resource set is used for beam measurement; if the parameter does not include a repetition (field), it indicates that the aperiodic CSI-RS resource set is used for CSI measurement.

In the method for configuring an aperiodic channel state information-reference signal in some embodiments of the present disclosure, when triggering the aperiodic CSI-RS, the network device may determine a scheduling offset threshold of the aperiodic CSI-RS based on the terminal capability information and the measurement behavior of the aperiodic CSI-RS, so as to determine beam information of the aperiodic CSI-RS, to ensure normal signal transmission and measurement, thereby improving communication reliability and validity.

The foregoing embodiments separately describe in detail the method for configuring an aperiodic channel state information-reference signal in different scenarios. A network device corresponding to the method is further described in the following embodiments with reference to the accompanying drawings.

Figure 3:
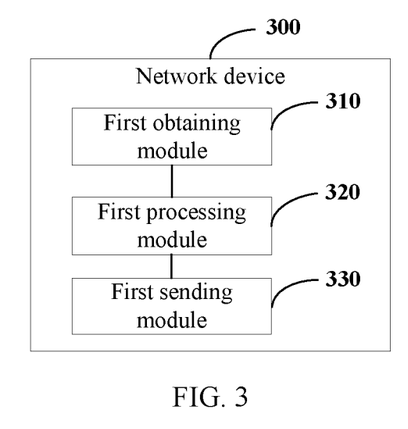
FIG. 3 is a schematic diagram of a module structure of a network device according to some embodiments of the present disclosure.

As shown in FIG. 3, a network device 300 in some embodiments of the present disclosure can implement details of the method in the foregoing embodiment of obtaining terminal capability information in the foregoing embodiment; determining a threshold of an aperiodic channel state information-reference signal CSI-RS based on measurement behavior of the aperiodic CSI-RS and the terminal capability information; and sending the threshold to a terminal. A same effect is achieved. The network device 300 specifically includes the following function modules:

a first obtaining module 310, configured to obtain terminal capability information;

a first processing module 320, configured to determine a threshold of an aperiodic channel state information-reference signal CSI-RS based on measurement behavior of the aperiodic CSI-RS and the terminal capability information; and a first sending module 330, configured to send the threshold to a terminal.

The first processing module 320 includes:

a first determining submodule, configured to: in a case that the measurement behavior is beam measurement, determine a value indicated by a specific parameter in the terminal capability information as the threshold.

The first processing module 320 further includes:

a second determining submodule, configured to: in a case that the measurement behavior is CSI measurement, if a value indicated by a specific parameter in the terminal capability information is greater than a preset value, determine one of the following values as the threshold, where
the value is:
a maximum value that is in optional values of the specific parameter and that is less than the preset value;
a minimum value that is in optional values of the specific parameter and that is less than the preset value; or
a specified value that is less than the preset value.

The specific parameter is a beam switching timing of the aperiodic CSI-RS.

The network device 300 further includes:
a second processing module, configured to determine a transmit beam of the aperiodic CSI-RS based on the threshold The second processing module includes
a third determining submodule, configured to: when a triggering offset of the aperiodic CSI-RS is less than the threshold, determine the transmit beam based on default quasi-co-location QCL information; and
a fourth determining submodule, configured to: when the triggering offset of the aperiodic CSI-RS is greater than or equal to the threshold, determine the transmit beam based on QCL information corresponding to a transmission configuration indication TCI state in downlink control information DCI.

The network device 300 further includes:
a second sending module, configured to send the aperiodic CSI-RS on the transmit beam.

The network device 300 further includes:
a third sending module, configured to send measurement behavior information to the terminal, where the measurement behavior information is used to indicate the measurement behavior of the aperiodic CSI-RS.

It should be noted that, in some embodiments of the present disclosure, when triggering the aperiodic CSI-RS, the network device may determine a scheduling offset threshold of the aperiodic CSI-RS based on the terminal capability information and the measurement behavior of the aperiodic CSI-RS, so as to determine beam information of the aperiodic CSI-RS, to ensure normal signal transmission and measurement, thereby improving communication reliability and validity.

To better implement the foregoing objective, an embodiment of the present disclosure further provides a network device. The network device includes a processor, a memory, and a computer program that is stored in the memory and that can run on the processor, where when the processor executes the computer program, steps of the method for configuring an aperiodic channel state information-reference signal described above are implemented. An embodiment of the present disclosure further provides a computer readable storage medium. The computer readable storage medium stores a computer program, and when a processor executes the computer program, steps of the method for configuring an aperiodic channel state information-reference signal described above are implemented.

Figure 4:
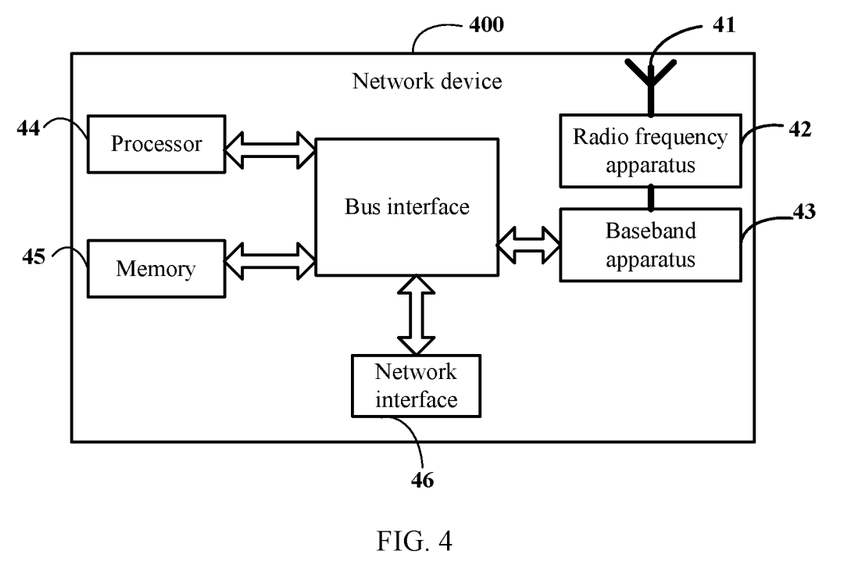
FIG. 4 is a block diagram of a network device according to some embodiments of the present disclosure.

Specifically, an embodiment of the present disclosure further provides a network device. As shown in FIG. 4, a network device 400 includes: an antenna 41, a radio frequency apparatus 42, and a baseband apparatus 43. The antenna 41 is connected to the radio frequency apparatus 42. In the uplink direction, the radio frequency apparatus 42 receives information through the antenna 41, and sends the received information to the baseband apparatus 43 for processing. In the downlink direction, the baseband apparatus 43 processes information to be sent and sends the information to the radio frequency apparatus 42, and the radio frequency apparatus 42 processes the received information and then sends the information through the antenna 41.

The foregoing frequency band processing apparatus may be located in the baseband apparatus 43, and the method performed by the network device in the foregoing embodiment may be implemented in the baseband apparatus 43. The baseband apparatus 43 includes a processor 44 and a memory 45.

The baseband apparatus 43 may include, for example, at least one baseband board, and a plurality of chips are arranged on the baseband board. As shown in FIG. 4, one of the chips is, for example, the processor 44, which is connected to the memory 45, to invoke a program in the memory 45, so as to perform the operations of the network device shown in the foregoing method embodiment.

The baseband apparatus 43 may further include a network interface 46, configured to exchange information with the radio frequency apparatus 42. For example, the interface is a Common Public Radio Interface (CPRI).

The processor herein may be a single processor, or may be a collective term for a plurality of processing elements. For example, the processor may be a CPU or an ASIC, or may be one or more integrated circuits that are configured to implement the foregoing method performed by the network device, for example, may be one or more microprocessors DSPs, or one or more field programmable gate arrays FPGAs. The storage element may be one memory or a collective term for a plurality of storage elements.

The memory 45 may be a volatile memory or a non-volatile memory, or may include both a volatile memory and a non-volatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 45 described in this application is intended to include but not limited to these and any other suitable types of memories.

Specifically, the network device in some embodiments of the present disclosure further includes a computer program that is stored in the memory 45 and that can run on the processor 44. The processor 44 invokes the computer program in the memory 45 to perform the method performed by the modules shown in FIG. 3.

Specifically, when invoked by the processor 44, the computer program may be used to: obtain terminal capability information;
determine a threshold of an aperiodic channel state information-reference signal CSI-RS based on measurement behavior of the aperiodic CSI-RS and the terminal capability information; and
send the threshold to a terminal.

In some embodiments of the present disclosure, when triggering the aperiodic CSI-RS, the network device may determine a scheduling offset threshold of the aperiodic CSI-RS based on the terminal capability information and the measurement behavior of the aperiodic CSI-RS, so as to determine beam information of the aperiodic CSI-RS, to ensure normal signal transmission and measurement, thereby improving communication reliability and validity.

The foregoing embodiment describes the method for configuring an aperiodic channel state information-reference signal in the present disclosure from the network device side. The following embodiment further describes the method for configuring an aperiodic channel state information-reference signal from the terminal side with reference to the accompanying drawings.

Figure 5:
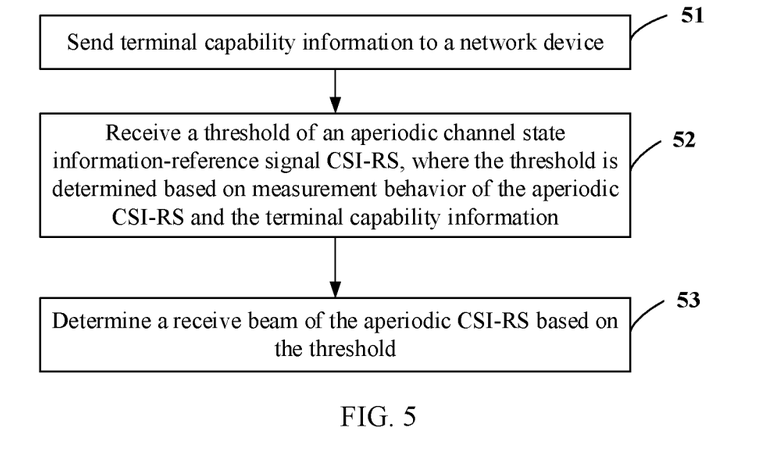
FIG. 5 is a schematic flowchart of a method for configuring an aperiodic channel state information-reference signal on a terminal side according to some embodiments of the present disclosure.

As shown in FIG. 5, a method for configuring an aperiodic channel state information-reference signal in the present disclosure is applied to a terminal side and includes the following steps.

Step 51: Send terminal capability information to a network device.

The terminal capability information, or referred to as terminal performance (UE capability) information, is used to indicate a data processing capability, a maximum spatial division multiplexing capability, a modulation and coding capability, and the like supported by the terminal. The terminal capability information includes a plurality of parameters that are used to represent different performance types, and a value of a parameter indicates a support capability of the terminal in a corresponding performance type. The terminal capability information includes a parameter such as a beam switching timing of an aperiodic channel state information-reference signal CSI-RS. The parameter is a minimum time length between triggering DCI of an aperiodic CSI-RS and sending of the aperiodic CSI-RS, for example, a time length or a quantity of symbols between the last symbol of the DCI and the first symbol of the aperiodic CSI-RS. A value (capability parameter) of the parameter is related to a subcarrier spacing, and the value of the parameter includes {114, 28, 48, 224, 336}.

Step 52: Receive a threshold of an aperiodic channel state information-reference signal CSI-RS, where the threshold is determined based on measurement behavior of the aperiodic CSI-RS and the terminal capability information.

The threshold is a scheduling offset threshold of the aperiodic CSI-RS. The measurement behavior includes but is not limited to beam measurement and CSI measurement. In other words, the aperiodic CSI-RS may be used for beam measurement, or may be used for CSI measurement.

Step 53: Determine a receive beam of the aperiodic CSI-RS based on the threshold.

The terminal determines spatial information (such as a beam) of the aperiodic CSI-RS based on the threshold, to facilitate receiving and subsequent measurement of the aperiodic CSI-RS.

In a case that the measurement behavior is beam measurement, the threshold is a value indicated by a specific parameter in the terminal capability information. This case corresponds to the scenario 1 in the foregoing embodiment on the network device side, and details are not described herein again.

Further, in a case that the measurement behavior is CSI measurement and a value indicated by a specific parameter in the terminal capability information is greater than a preset value, the threshold is one of the following values, where the value is:

a maximum value that is in optional values of the specific parameter and that is less than the preset value;

a minimum value that is in optional values of the specific parameter and that is less than the preset value; or a specified value that is less than the preset value.

Determining of the threshold corresponds to the scenario 2 in the foregoing embodiment on the network device side, and details are not described herein again.

It should be noted that the threshold may be received by the terminal from the network device side, or may be determined by the terminal according to a preset rule. A determining manner of the threshold by the terminal may be the same as a manner of determining the threshold by the network device side.

For example, in a case that the measurement behavior of the aperiodic CSI-RS is beam measurement, the value of the specific parameter reported by the terminal may be determined as the scheduling offset threshold of the aperiodic CSI-RS. The specific parameter may be a beam switching timing of the aperiodic CSI-RS, and an optional value of the specific parameter may be {14, 28, 48, 224, 336}. Assuming that the beam switching timing of the aperiodic CSI-RS reported by the terminal is one of {14, 28, 48, 224, 336}, a specific value of the beam switching timing reported by the terminal is determined as the scheduling offset threshold of the aperiodic CSI-RS. For example, if the beam switching timing reported by the terminal is 14, 14 is determined as the threshold; if the reported beam switching timing is 224, 224 is determined as the threshold.

For another example, in a case that the measurement behavior of the aperiodic CSI-RS is CSI measurement, if a value of a specific parameter reported by the terminal is greater than a preset value, one of the following values is determined as the threshold, where the value is:

a maximum value that is in optional values of the specific parameter and that is less than the preset value;

a minimum value that is in optional values of the specific parameter and that is less than the preset value; or a specified value that is less than the preset value. The specified value may be indicated by the network device, or may be predefined (such as a protocol agreement or a vendor preconfiguration).

The preset value may be a maximum value available for a triggering offset of the aperiodic CSI-RS, or the preset value may be a value ranging from the $M^{th}$ optional value to the $N^{th}$ optional value of the specific parameter. For another example, in a case that the measurement behavior of the aperiodic CSI-RS is CSI measurement, if the value of the specific parameter reported by the terminal is less than or equal to the preset value, the value of the specific parameter reported by the terminal is determined as the scheduling offset threshold of the aperiodic CSI-RS.

Further, step 53 includes:

when a triggering offset of the aperiodic CSI-RS is less than the threshold, determining the receive beam based on default quasi-co-location QCL information, that is, when the triggering offset is less than the determined threshold, the terminal determines the receive beam of the aperiodic CSI-RS by using the default QCL information; and when the triggering offset of the aperiodic CSI-RS is greater than or equal to the threshold, determining the receive beam based on QCL information corresponding to a transmission configuration indication TCI state in downlink control information DCI, that is, when the triggering offset is greater than or equal to the determined threshold, the terminal determines the receive beam of the aperiodic CSI-RS based on the QCL information corresponding to the TCI state indicated by the DCI.

After step 53, the method further includes: receiving and measuring the aperiodic CSI-RS on the receive beam to obtain a measurement result corresponding to the measurement behavior. Assuming that the measurement behavior is beam measurement, the terminal receives the aperiodic CSI-RS on the receive beam, and performs beam measurement based on the aperiodic CSI-RS to obtain the corresponding measurement result. Assuming that the measurement behavior is CSI measurement, the terminal receives the aperiodic CSI-RS on the receive beam, and performs CSI measurement based on the aperiodic CSI-RS to obtain the corresponding measurement result.

Further, in this embodiment, the measurement behavior may be indicated by measurement behavior information configured by the network device. Before the step of receiving and measuring the aperiodic CSI-RS on the receive beam to obtain a measurement result corresponding to the measurement behavior, the method further includes: receiving measurement behavior information used to indicate the measurement behavior of the aperiodic CSI-RS, where the measurement behavior information is used to indicate beam measurement or CSI measurement.

In the method for configuring an aperiodic channel state information-reference signal in some embodiments of the present disclosure, when triggering the aperiodic CSI-RS, the terminal receives the threshold of the aperiodic CSI-RS sent by the network device. Because the threshold is determined based on the terminal capability information and the measurement behavior of the aperiodic CSI-RS, the terminal can correctly determine beam information of the aperiodic CSI-RS based on the threshold, to ensure normal signal transmission and measurement, thereby improving communication reliability and validity.

The foregoing embodiments describe in detail the method for configuring an aperiodic channel state information-reference signal in different scenarios. A terminal corresponding to the method is further described below with reference to the accompanying drawings.

Figure 6:
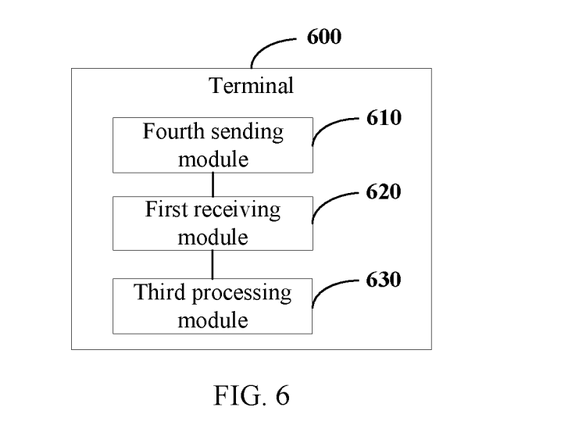
FIG. 6 is a schematic diagram of a module structure of a terminal according to some embodiments of the present disclosure.

As shown in FIG. 6, a terminal 600 in some embodiments of the present disclosure can implement details of the method in the foregoing embodiment of sending terminal capability information to a network device; receiving a threshold of an aperiodic channel state information-reference signal CSI-RS, where the threshold is determined based on measurement behavior of the aperiodic CSI-RS and the terminal capability information; and determining a receive beam of the aperiodic CSI-RS based on the threshold. A same effect is achieved. The terminal 600 specifically includes the following function modules:

a fourth sending module 610, configured to send terminal capability information to a network device;

a first receiving module 620, configured to receive a threshold of an aperiodic channel state information-reference signal CSI-RS, where the threshold is determined based on measurement behavior of the aperiodic CSI-RS and the terminal capability information; and a third processing module 630, configured to determine a receive beam of the aperiodic CSI-RS based on the threshold.

In a case that the measurement behavior is beam measurement, the threshold is a value indicated by a specific parameter in the terminal capability information.

In a case that the measurement behavior is CSI measurement and a value indicated by a specific parameter in the terminal capability information is greater than a preset value, the threshold is one of the following values, where the value is:

a maximum value that is in optional values of the specific parameter and that is less than the preset value;

a minimum value that is in optional values of the specific parameter and that is less than the preset value; or a specified value that is less than the preset value.

The specific parameter is a beam switching timing of the aperiodic CSI-RS.

The third processing module 630 includes:

a fifth determining submodule, configured to: when a triggering offset of the aperiodic CSI-RS is less than the threshold, determine the receive beam based on default quasi-co-location QCL information; and a sixth determining submodule, configured to: when the triggering offset of the aperiodic CSI-RS is greater than or equal to the threshold, determine the receive beam based on QCL information corresponding to a transmission configuration indication TCI state in downlink control information DCI.

The terminal 600 further includes:

a measurement module, configured to receive and measure the aperiodic CSI-RS on the receive beam to obtain a measurement result corresponding to the measurement behavior.

The terminal 600 further includes:

a second receiving module, configured to receive measurement behavior information used to indicate the measurement behavior of the aperiodic CSI-RS, where the measurement behavior information is used to indicate beam measurement or CSI measurement.

It should be noted that, in some embodiments of the present disclosure, when triggering the aperiodic CSI-RS, the terminal receives the threshold of the aperiodic CSI-RS sent by the network device. Because the threshold is determined based on the terminal capability information and the measurement behavior of the aperiodic CSI-RS, the terminal can correctly determine beam information of the aperiodic CSI-RS based on the threshold, to ensure normal signal transmission and measurement, thereby improving communication reliability and validity.

It should be noted that, division of the modules of the network device and the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementations of other modules are similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or instructions in the form of software.

For example, the modules may be configured as one or more integrated circuits for implementing the foregoing method, for example, one or more Application Specific Integrated Circuit (ASIC), one or more microprocessors (Digital Signal Processor (DSP)), or one or more Field Programmable Gate Array (FPGA). For another example, when a module above is implemented by invoking program code by using a processing element, the processing element may be a general-purpose processor, for example, a Central Processing Unit (CPU) or another processor that can invoke program code. For another example, these modules may be integrated together, and implemented in a form of a System-On-a-Chip (SOC).

Figure 7:
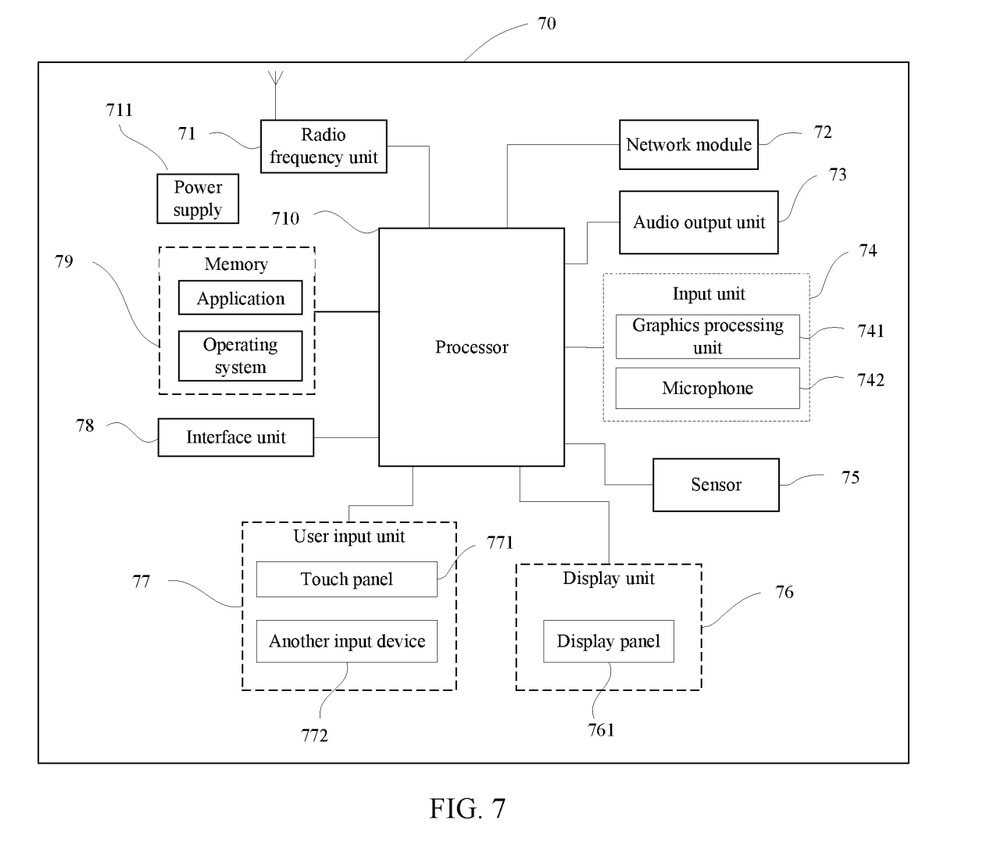
FIG. 7 is a block diagram of a terminal according to some embodiments of the present disclosure.

To better implement the foregoing objective, further, FIG. 7 is a schematic structural diagram of hardware of a terminal according to the embodiments of the present disclosure. A terminal 70 includes but is not limited to components such as a radio frequency unit 71, a network module 72, an audio output unit 73, an input unit 74, a sensor 75, a display unit 76, a user input unit 77, an interface unit 78, a memory 79, a processor 710, and a power supply 711. Those skilled in the art may understand that the terminal structure shown in FIG. 7 does not constitute a limitation on the terminal. The terminal may include more or fewer components than those shown in the figure, or some components may be combined, or there may be a different component arrangement. In some embodiments of the present disclosure, the terminal includes but is not limited to a mobile phone, a tablet computer, a notebook computer, a palmtop computer, an in-vehicle terminal, a wearable device, a pedometer, and the like.

The radio frequency unit 71 is configured to: send terminal capability information to a network device; and
receive a threshold of an aperiodic channel state information-reference signal CSI-RS, where the threshold is determined based on measurement behavior of the aperiodic CSI-RS and the terminal capability information.

The processor 710 is configured to determine a receive beam of the aperiodic CSI-RS based on the threshold.

In some embodiments of the present disclosure, when triggering the aperiodic CSI-RS, the terminal receives the threshold of the aperiodic CSI-RS sent by the network device. Because the threshold is determined based on the terminal capability information and the measurement behavior of the aperiodic CSI-RS, the terminal can correctly determine beam information of the aperiodic CSI-RS based on the threshold, to ensure normal signal transmission and measurement, thereby improving communication reliability and validity.

It should be understood that, in some embodiments of the present disclosure, the radio frequency unit 71 may be configured to receive and send information or receive and send a signal in a call process. Specifically, after receiving downlink data from a base station, the radio frequency unit 71 sends the downlink data to the processor 710 for processing. In addition, the radio frequency unit 71 sends uplink data to the base station. Usually, the radio frequency unit 71 includes but is not limited to an antenna, at least one amplifier, a transceiver, a coupler, a low noise amplifier, a duplexer, and the like. In addition, the radio frequency unit 71 may communicate with a network and another device through a wireless communication system.

The terminal provides wireless broadband Internet access to a user through the network module 72, for example, helps the user receive and send emails, browse web pages, and access streaming media.

The audio output unit 73 may convert audio data received by the radio frequency unit 71 or the network module 72 or stored in the memory 79 into an audio signal, and output the audio signal as sound. In addition, the audio output unit 73 may further provide audio output (for example, call signal receiving sound or message receiving sound) related to a specific function performed by the terminal 70. The audio output unit 73 includes a speaker, a buzzer, a receiver, and the like.

The input unit 74 is configured to receive an audio signal or a video signal. The input unit 74 may include a Graphics Processing Unit (GPU) 741 and a microphone 742. The graphics processing unit 741 processes image data of a static picture or a video obtained by an image capturing apparatus (for example, a camera) in a video capturing mode or an image capturing mode. A processed image frame may be displayed on the display unit 76. The image frame processed by the graphics processing unit 741 can be stored in the memory 79 (or another storage medium) or sent via the radio frequency unit 71 or the network module 72. The microphone 742 may receive sound and can process such sound into audio data. The processed audio data can be converted into a format output that can be sent to a mobile communications base station through the radio frequency unit 71 in a telephone call mode.

The terminal 70 further includes at least one sensor 75, for example, a light sensor, a motion sensor, and other sensors. Specifically, the light sensor includes an ambient light sensor and a proximity sensor, where the ambient light sensor can adjust brightness of the display panel 761 according to brightness of ambient light, and the proximity sensor can turn off the display panel 761 and/or backlight when the terminal 70 moves towards the ear. As a type of the motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), and the like. The sensor 75 may further include a fingerprint sensor, a pressure sensor, an iris sensor, a molecule sensor, a gyroscope, a barometer, a hygrometer, a thermometer, and an infrared sensor. Details are not described herein.

The display unit 76 is configured to display information entered by a user or information provided for a user. The display unit 76 may include the display panel 761, and the display panel 761 may be configured in a form of a Liquid Crystal Display (LCD), an Organic Light-Emitting Diode (OLED), or the like.

The user input unit 77 may be configured to receive input numeral or character information, and generate key signal input related to user setting and functional control of the terminal. Specifically, the user input unit 77 includes a touch panel 771 and another input device 772. The touch panel 771 is also referred to as a touchscreen, and may collect a touch operation performed by a user on or near the touch panel 771 (such as an operation performed by a user on the touch panel 771 or near the touch panel 771 by using any proper object or accessory, such as a finger or a stylus). The touch panel 771 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 710, and can receive and execute a command sent by the processor 710. In addition, the touch panel 771 can be implemented in various types such as resistive, capacitive, infrared, and surface acoustic waves. In addition to the touch panel 771, the user input unit 77 may further include the another input device 772. Specifically, the another input device 772 may include but is not limited to a physical keyboard, a functional button (such as a volume control button or a power on/off button), a trackball, a mouse, and a joystick. Details are not described herein.

Further, the touch panel 771 may cover the display panel 761. When detecting the touch operation on or near the touch panel 771, the touch panel 771 transmits the touch operation to the processor 710 to determine a type of a touch event, and then the processor 710 provides corresponding visual output on the display panel 761 based on the type of the touch event. In FIG. 7, the touch panel 771 and the display panel 761 are used as two independent components to implement input and output functions of the terminal. However, in some embodiments, the touch panel 771 and the display panel 761 may be integrated to implement the input and output functions of the terminal. This is not specifically limited herein.

The interface unit 78 is an interface connecting an external apparatus to the terminal 70. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 78 may be configured to receive input (for example, data information and power) from an external apparatus and transmit the received input to one or more elements within the terminal 70, or may be configured to transmit data between the terminal 70 and the external apparatus.

The memory 79 may be configured to store software programs and various data. The memory 79 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 79 may include a high-speed random access memory, and may further include a nonvolatile memory, for example, at least one magnetic disk storage device, a flash storage device, or another volatile solid-state storage device.

The processor 710 is a control center of the terminal. The processor 710 uses various interfaces and lines to connect the various parts of the entire terminal, and performs various functions of the terminal and processes data by running or executing software programs and/or modules stored in the memory 79 and invoking data stored in the memory 79, to monitor the terminal as a whole. The processor 710 may include one or more processing units. Optionally, the processor 710 may integrate an application processor and a modem processor. The application processor mainly deals with an operating system, a user interface, and an application. The modem processor mainly deals with wireless communication. It can be understood that alternatively, the modem processor may not be integrated into the processor 710.

The terminal 70 may further include a power supply 711 (such as a battery) that supplies power to each component. Optionally, the power supply 711 may be logically connected to the processor 710 by using a power management system, to implement functions such as charging, discharging, and power consumption management by using the power management system.

In addition, the terminal 70 includes some function modules not shown, and details are not described herein again.

Optionally, some embodiments of the present disclosure further provides a terminal, including a processor 710, a memory 79, and a computer program that is stored in the memory 79 and that can run on the processor 710. When the processor 710 executes the computer program, the processes of the foregoing method for configuring an aperiodic channel state information-reference signal are implemented and a same technical effect can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a Radio Access Network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a Personal Communication Service (PCS) phone, a cordless telephone set, a Session Initiation Protocol (SIP) phone, a Wireless Local Loop (WLL) station, or a Personal Digital Assistant (PDA). The wireless terminal may also be referred to as a system, a Subscriber Unit, a Subscriber Station, a Mobile Station, a Mobile console, a Remote Station, a Remote Terminal, an Access Terminal, a User Terminal, a User Agent, or a User Device (or User Equipment). This is not limited herein.

Some embodiments of the present disclosure further provide a computer readable storage medium. The computer readable storage medium stores a computer program, and when a processor executes the computer program, the processes of the method for configuring an aperiodic channel state information-reference signal are implemented and a same technical effect can be achieved. To avoid repetition, details are not described herein again. The computer readable storage medium may be a ROM, a RAM, a magnetic disk, a compact disc, or the like.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in each embodiment of the present disclosure may be integrated into one processing unit, or each unit may have separate physical existence, or two or more units may be integrated in one unit.

If the function is implemented in the form of software function units and sold or used as independent products, the function may be stored in a computer readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or a compact disc, that can store program code.

In addition, it should be noted that in the apparatuses and methods of the present disclosure, it is obvious that the components or the steps may be divided and/or recombined. These division and/or recombination should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any of the steps or the components of the methods and the apparatuses of the present disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should be further noted that in the apparatuses and methods of the present disclosure, it is obvious that the components or the steps may be divided and/or recombined. These division and/or recombination should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

The invention claimed is:

1. A method for configuring an aperiodic Channel State Information-Reference Signal (CSI-RS), performed by a terminal, comprising:
    sending terminal capability information to a network device;
    determining a threshold for a scheduling offset between a triggering Downlink Control Information (DCI) of an aperiodic CSI-RS and sending of the aperiodic CSI-RS, wherein the threshold is determined based on measurement behavior of the aperiodic CSI-RS and the terminal capability information,
        wherein when the measurement behavior is Channel State Information (CSI) measurement and a value indicated by a beam switching timing of the aperiodic CSI-RS in the terminal capability information is greater than a preset value, the threshold is set to be one of the following values:
        a maximum value that is in optional values of the beam switching timing of the aperiodic CSI-RS and that is less than the preset value,
        a minimum value that is in optional values of the beam switching timing of the aperiodic CSI-RS and that is less than the preset value, or
        a specified value that is less than the preset value; and
    determining a receive beam of the aperiodic CSI-RS based on the threshold.

2. The method for configuring an aperiodic CSI-RS according to claim 1, wherein when the measurement behavior is beam measurement, the threshold is a value indicated by a specific parameter in the terminal capability information.

3. The method for configuring an aperiodic CSI-RS according to claim 2, wherein the specific parameter is the beam switching timing of the aperiodic CSI-RS.

4. The method for configuring an aperiodic channel state information-reference signal according to claim 1, wherein the step of determining a receive beam of the aperiodic CSI-RS based on the threshold comprises:
    when a triggering offset of the aperiodic CSI-RS is less than the threshold, determining the receive beam based on default Quasi-Co-Location (QCL) information; and
    when the triggering offset of the aperiodic CSI-RS is greater than or equal to the threshold, determining the receive beam based on QCL information corresponding to a Transmission Configuration Indication (TCI) state in Downlink Control Information (DCI).

5. The method for configuring an aperiodic CSI-RS according to claim 1, after the step of determining a receive beam of the aperiodic CSI-RS based on the threshold, further comprising:
  receiving and measuring the aperiodic CSI-RS on the receive beam to obtain a measurement result corresponding to the measurement behavior.

6. The method for configuring an aperiodic CSI-RS according to claim 5, before the step of receiving and measuring the aperiodic CSI-RS on the receive beam to obtain a measurement result corresponding to the measurement behavior, further comprising:
  receiving measurement behavior information used to indicate the measurement behavior of the aperiodic CSI-RS, wherein the measurement behavior information is used to indicate beam measurement or CSI measurement.

7. A terminal, comprising a processor, a memory, and a computer program that is stored in the memory and that can run on the processor, wherein when the processor executes the computer program, a method for configuring an aperiodic CSI-RS comprising:
  sending terminal capability information to a network device;
  determining a threshold for a scheduling offset between a triggering Downlink Control Information (DCI) of an aperiodic CSI-RS and sending of the aperiodic CSI-RS, wherein the threshold is determined based on measurement behavior of the aperiodic CSI-RS and the terminal capability information,
  wherein when the measurement behavior is CSI measurement and a value indicated by a beam switching timing of the aperiodic CSI-RS in the terminal capability information is greater than a preset value, the threshold is set to be one of the following values:
  a maximum value that is in optional values of the beam switching timing of the aperiodic CSI-RS and that is less than the preset value,
  a minimum value that is in optional values of the beam switching timing of the aperiodic CSI-RS and that is less than the preset value, or
  a specified value that is less than the preset value; and
  determining a receive beam of the aperiodic CSI-RS based on the threshold.

8. The terminal according to claim 7, wherein when the measurement behavior is beam measurement, the threshold is a value indicated by a specific parameter in the terminal capability information.

9. The terminal according to claim 8, wherein the specific parameter is the beam switching timing of the aperiodic CSI-RS.

10. The terminal according to claim 7, wherein the step of determining a receive beam of the aperiodic CSI-RS based on the threshold comprises:
  when a triggering offset of the aperiodic CSI-RS is less than the threshold, determining the receive beam based on default Quasi-Co-Location (QCL) information; and
  when the triggering offset of the aperiodic CSI-RS is greater than or equal to the threshold, determining the receive beam based on QCL information corresponding to a TCI state in DCI.

11. The terminal according to claim 7, after the step of determining a receive beam of the aperiodic CSI-RS based on the threshold, further comprising:
  receiving and measuring the aperiodic CSI-RS on the receive beam to obtain a measurement result corresponding to the measurement behavior.

12. The terminal according to claim 11, before the step of receiving and measuring the aperiodic CSI-RS on the receive beam to obtain a measurement result corresponding to the measurement behavior, further comprising:
  receiving measurement behavior information used to indicate the measurement behavior of the aperiodic CSI-RS, wherein the measurement behavior information is used to indicate beam measurement or CSI measurement.

13. A non-transitory computer readable storage medium, wherein the non-transitory computer readable storage medium stores a computer program, and when a processor executes the computer program, a method for configuring an aperiodic CSI-RS comprising:
  sending terminal capability information to a network device;
  determining a threshold for a scheduling offset between a triggering Downlink Control Information (DCI) of an aperiodic CSI-RS and sending of the aperiodic CSI-RS, wherein the threshold is determined based on measurement behavior of the aperiodic CSI-RS and the terminal capability information,
  wherein when the measurement behavior is CSI measurement and a value indicated by a beam switching timing of the aperiodic CSI-RS in the terminal capability information is greater than a preset value, the threshold is set to be one of the following values:
  a maximum value that is in optional values of the beam switching timing of the aperiodic CSI-RS and that is less than the preset value,
  a minimum value that is in optional values of the beam switching timing of the aperiodic CSI-RS and that is less than the preset value, or
  a specified value that is less than the preset value; and
  determining a receive beam of the aperiodic CSI-RS based on the threshold.

14. The non-transitory computer readable storage medium according to claim 13, wherein when the measurement behavior is beam measurement, the threshold is a value indicated by a specific parameter in the terminal capability information.

15. The non-transitory computer readable storage medium according to claim 14, wherein the specific parameter is the beam switching timing of the aperiodic CSI-RS.

16. The non-transitory computer readable storage medium according to claim 13, wherein the step of determining a receive beam of the aperiodic CSI-RS based on the threshold comprises:
  when a triggering offset of the aperiodic CSI-RS is less than the threshold, determining the receive beam based on default Quasi-Co-Location (QCL) information; and
  when the triggering offset of the aperiodic CSI-RS is greater than or equal to the threshold, determining the receive beam based on QCL information corresponding to a TCI state in DCI.

17. The non-transitory computer readable storage medium according to claim 13, after the step of determining a receive beam of the aperiodic CSI-RS based on the threshold, further comprising:
  receiving and measuring the aperiodic CSI-RS on the receive beam to obtain a measurement result corresponding to the measurement behavior.

* * * * *